United States Patent [19]

Schumacher

[11] 3,710,048
[45] Jan. 9, 1973

[54] MOTOR VEHICLE PLUNGER TYPE SWITCH UNIT WITH SELF-ADJUSTING SHAFT COUPLING CONNECTION

[75] Inventor: Cecil W. Schumacher, Letchworth, England

[73] Assignee: Borg-Warner Limited, Letchworth, England

[22] Filed: June 28, 1971

[21] Appl. No.: 157,523

[30] Foreign Application Priority Data

Sept. 24, 1970 Great Britain..................45,634/70

[52] U.S. Cl................200/52 R, 64/15 B, 200/16 B, 200/17 R, 200/61.81, 200/61.89
[51] Int. Cl..............................H01h 3/14, H01h 3/38
[58] Field of Search........200/16, 52 R, 61.89, 159 R, 200/153 LB; 64/15 B; 85/36, 50 R

[56] References Cited

UNITED STATES PATENTS

| | | | |
|---|---|---|---|
| 3,251,956 | 5/1966 | Rasor et al.................. | 200/153 LB X |
| 3,105,884 | 10/1963 | Cottrell.......................... | 200/61.89 |
| 3,007,726 | 11/1961 | Parkin............................ | 85/36 X |
| 3,272,929 | 9/1966 | Hacker........................... | 200/16 B X |
| 2,100,232 | 11/1937 | Barry............................. | 64/15 B |
| 3,428,842 | 2/1969 | Harris........................... | 85/50 R X |
| 2,621,947 | 12/1952 | Markvart........................ | 85/36 X |

Primary Examiner—J. R. Scott
Attorney—Richard G. Kinney

[57] ABSTRACT

A self-adjusting start inhibitor switch unit for installation on motor vehicles equipped with transmissions is disclosed. The switch unit alternatively allows for actuation of the vehicle's engine starting circuit or completes the circuit to light the vehicle's reverse lamps or does neither depending upon the axial displacement of a spool which is moved by a plunger which rides on a cam surface that responds to the transmission shift lever setting. A locking washer connection between the plunger and spool allows the plunger to automatically and inverse-telescopically adjust to the correct arrangement as the switch unit is attached to the transmission housing or other seating and thus allows for a greater range of tolerances in the switch unit's housing, the transmission housing and the use of less labor in affixing the switch unit.

11 Claims, 9 Drawing Figures

INVENTOR
CECIL SCHUMACHER

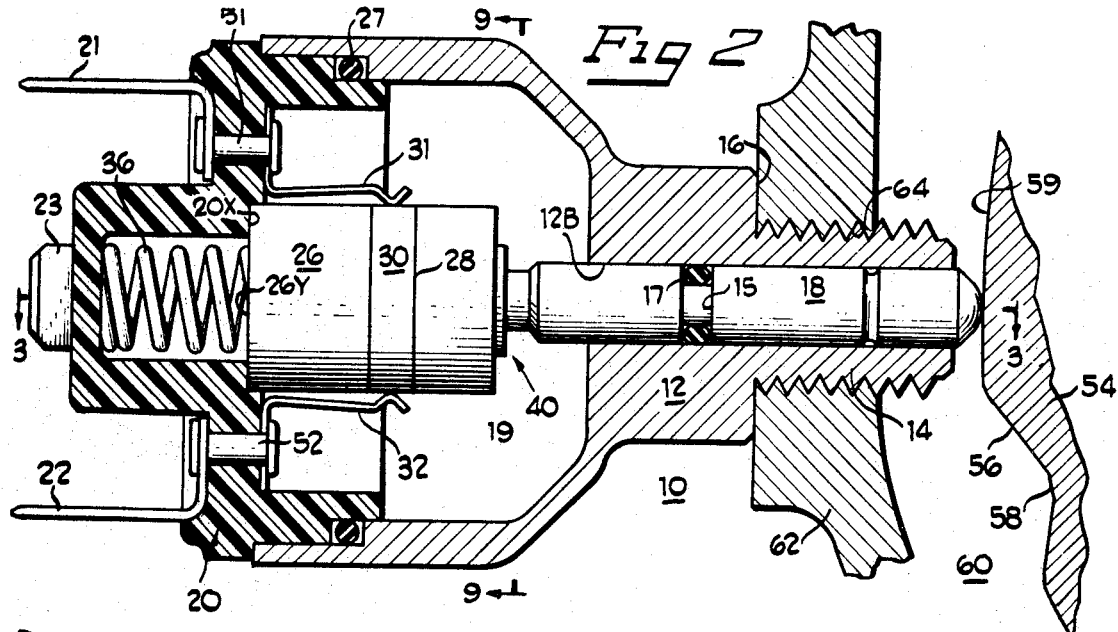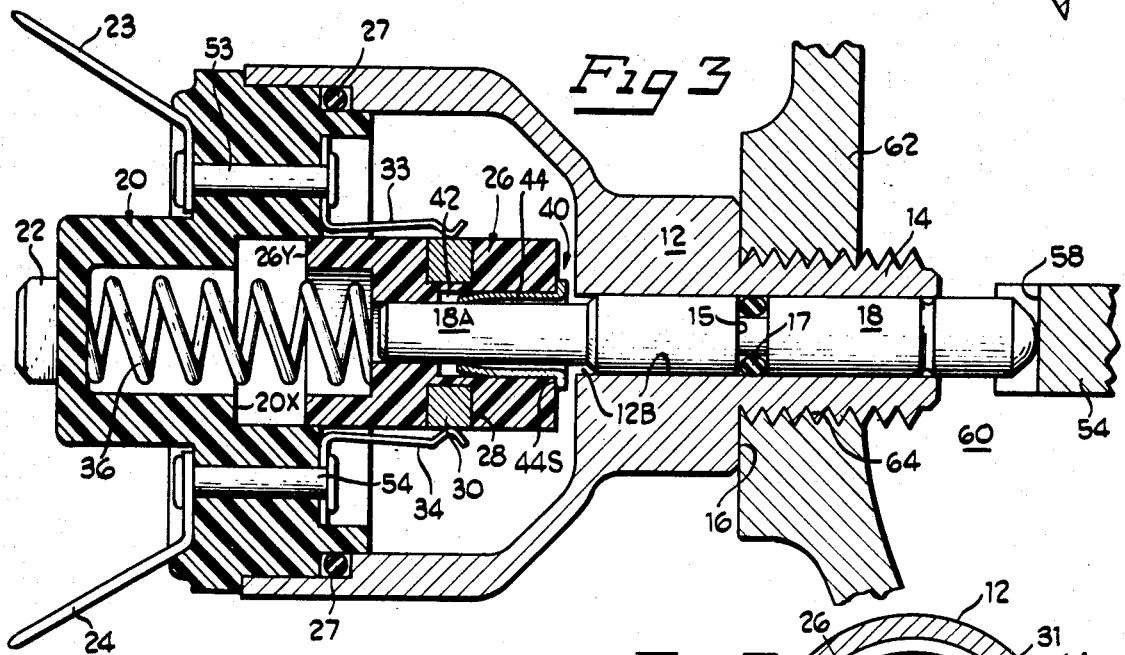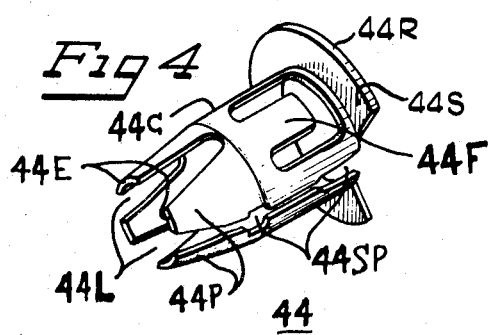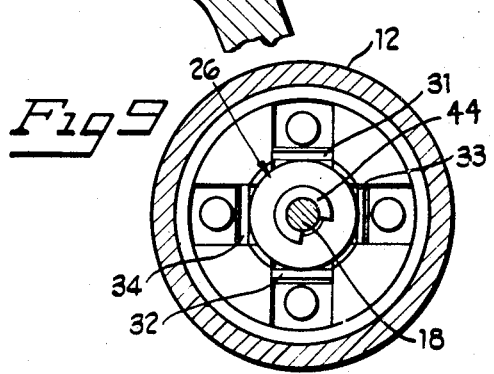

3,710,048

MOTOR VEHICLE PLUNGER TYPE SWITCH UNIT WITH SELF-ADJUSTING SHAFT COUPLING CONNECTION

FIELD OF THE INVENTION

The present invention is directed to an improved switch unit of the type that is used to inhibit engine starting of vehicles when their transmissions are conditioned to transmit propelling power.

BACKGROUND OF THE INVENTION

Inhibitor switch units, which are also termed "neutral" switch units, have been employed in motor vehicles having automatic transmissions to prevent starting or attempts to start the engine when the engine is coupled through the transmission to propel the vehicle. For example, reference could be had to the switch unit disclosed in U.S. Pat. No. 3,242,280, entitled "Transmission Neutral Switch" and issued in the name of LaV. M. Krieger. Such switch units are conventionally affixed to the transmission housing as shown in that patent, or coupled to the transmission itself or else positioned adjacent to the selector level mechanism or other selector unit.

It is the present practice with some commercial automobile inhibitor switch units to achieve the proper spacial relationship between the switch actuating member and the switch unit during assembly by allowing for a range of positions for the unit and, by trial-and-error and human observation, adjusting the unit's position until it operates properly and then permanently affixing the unit in that place.

As recognized in the Krieger patent and also in U.S. Pat. No. 3,423,549 entitled "Vehicle Safety Control Apparatus Having a Self-Adjusting Switch" which issued in the name of R. M. Sondej, it is desirable to allow for variations or manufacturing tolerances between the switch actuating member and the housing to which the switch unit is affixed.

While the schemes of the aforementioned Krieger and Sondej patents allow for tolerance build-up they do it by providing an additional moving part surrounding the main switch actuating plunger which moving part is mechanically biased against the actuating member. This biasing produces an additional drag or frictional resistance to movement and requires a correspondingly greater force to displace the plunger and results in greater wear on the parts. Moreover, as the degree of misplacement increases, the mechanical bias increases requiring a corresponding increase in the actuating force and a corresponding increase in wear.

These particular prior art self-adjusting switch units also provide two axially moving shaft surfaces exposed to the actuating member. When the actuating member is within the conventional transmission housing and the switch unit mounted through that housing, as described in the aforementioned patents, special provision for sealing against transmission oil must be provided or else the electrical contact points must be opened and closed in the environment of transmission oil. Unavoidable sparking across the contact points in the environment of transmission oil is undesirable as it may result in increased contact corrosion and fouling and, in the case of comtaminated oil, possible short-circuiting.

SUMMARY OF THE INVENTION

In overcoming one or more of the above disadvantages of prior art inhibitor switch units the present invention provides such a switch unit in which the plunger and an internal contact sleeve or spool are connected to allow telescopic motion therebetween in response to a force greater than that normally exerted in closing, so as to adjust automatically during the initial seating of the unit into its operational position. This leaves only one unit, the interlocked spool and plunger, to move in response to the switch actuating member.

Because the adjustment takes place internally the electrical contact surfaces are easily sealed from the transmission fluid by providing a sealing ring between the plunger and its housings. This eliminates problems of contact fouling or shorting caused by transmission oil.

As each plunger is precisely aligned with the switch acting member after installation the pressure and wear will be essentially the same for all switch units in a production run, despite tolerance build-ups and variations between individual housings and seatings.

BRIEF DESCRIPTION OF THE DRAWINGS

The features of the present invention which are believed to be novel are set forth with particularity in the appended claims. The invention, together with the further advantages thereof, may best be understood by reference to the following description taken in connection with the accompanying drawings, in the several figures of which like reference numerals identify like elements, and in which:

FIG. 2 is a longitudinal sectional view of the switch unit of FIG. 1 installed in a transmission; which transmission is shown partly in section and partly broken away;

FIG. 3 is a longitudinal sectional view of the switch unit of FIGS. 1 and 2, as seen from the line 3—3 in FIG. 2 with certain parts in a moved position;

FIG. 4 is a perspective view of a locking washer forming a part of the switch unit of FIGS. 1-3;

FIG. 9 is a sectional view of the switch unit as seen from the line 9—9 in FIG. 2.

DETAILED DESCRIPTION

Figure 1:
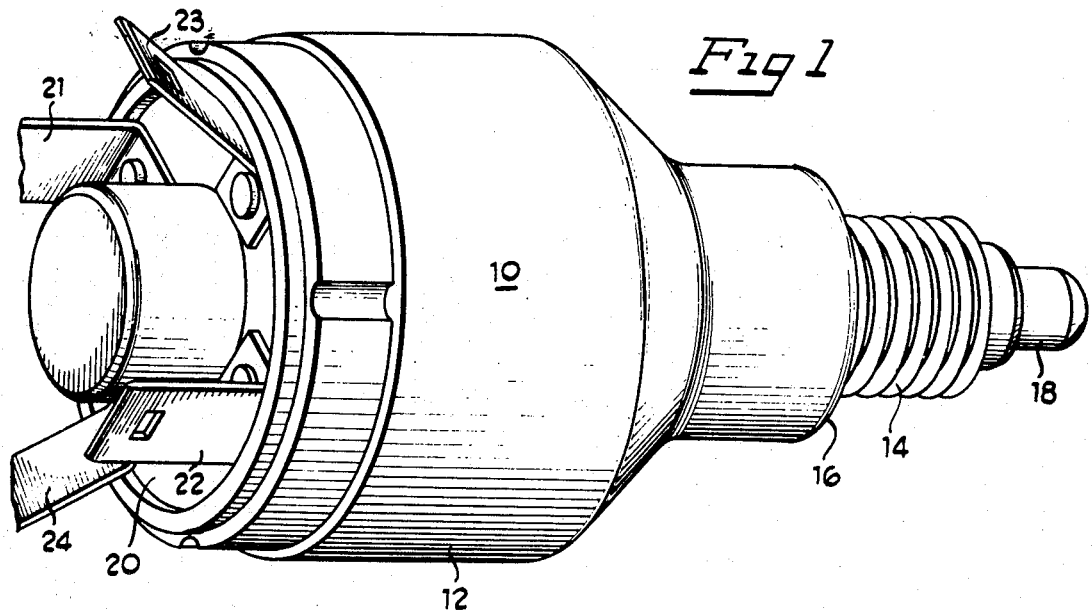
FIG. 1 is a perspective view of one embodiment of a start inhibitor switch unit constructed in accordance with the present invention.

Referring to FIG. 1, there is depicted a vehicle transmission switch unit constructed in accordance with the present invention which is generally designated by the numeral 10. The switch unit 10 includes a body or case 12 having a threaded cylindrical front end section 14 projecting from a stop shoulder 16. Projecting from the center of the threaded section 14 of the case 12 is a plunger 18. At the opposite end of the switch unit 10 is an insulating base 20 from which four electrical terminals 21, 22, 23 and 24 extend. The terminal pair 21, 22 are for connection to control the reverse indicating or warning lamps of a vehicle while the terminal pair 23, 24 is for connection in series with the vehicle engine starting circuit. The axial displacement of the plunger 18 alternatively either completes a current path between only the terminals 21, 22 or completes a circuit path only between the terminals 23, 24 or completes no current path between any of the terminals 21–24.

As better seen in FIG. 2, the plunger 18 extends through a cylindrical bore 12B into a closed zone 19 enclosed by the body 12 and base 20. Within the case 12, the plunger 18 is coupled to a generally cylindrical and electrically insulating sleeve or spool 26 which has an encircling generally annular groove 28 formed about its outer cylindrical surface to receive a conducting ring 30. The terminals 21 and 22 are electrically connected through the insulating base 20 to respectively switch contacts 31, 32 which are mechanically biased to bear resiliently against the outer cylindrical surface of the spool 26. As also shown in FIG. 2, when the plunger 18 is moved inward to move the spool 26 to its extreme rearward position the contacts 31 and 32 bear against the ring 30 to complete a current path between the terminals 21 and 22 thus "making" the electrical contact between these contacts. This current path includes a pair of rivets 51 and 52 which pass through the base 20 to both physically secure and electrically connect the terminals and contacts. It should be noted that the outer surface of the ring 30 is flush with the cylindrical surface of the spool 26 to allow smooth relative movement between the ring 30 and the contact points 31, 32.

The spool 26 and its coupled plunger 18 are mechanically biased by means of a helical spring 36 toward the threaded end 14 (to the right as seen in FIG. 2). The spool 26 has a limited range of positions between that shown in FIG. 2 in which its rearward edge, designated 26Y, makes contact with a stop surface 20X formed on the forward facing surface of the base 20 and its extreme forward position shown in FIG. 3. As the spool 26 moves forward it breaks the contact made between the contact points 31, 32.

As depicted in FIG. 3, the terminals 23, 24 can be seen to be electrically connected to internal switch contacts 33, 34 respectively. These contacts 33, 34 are constructed similarly to the contacts 31, 32 but bear against the spool surface at a place forward of the point of bearing of those contacts 31, 32. The orientation of the contacts 31, 32, 33 and 34 about the axis of the spool 26 is shown in FIG. 9. As can be there seen, these contacts 31–34 remain electrically isolated from one another. With the spool 26 at the extreme forward position, as depicted in FIG. 3, an electrical contact is made, i.e. a current path is created between the terminals 23 and 24 through respective connecting rivets 53, 54, the contacts 33, 34 and the ring 30. This second electrical contact is broken when the plunger 18 moves the ring holding spool 26 back toward the surface 20X.

The switch unit 10 is preferably employed physically mounted through a transmission case and also includes, as can be seen from FIGS. 2 and 3, a sealing O-ring 17 seated in a groove 15 in the plunger 18. The O-ring 17 is positioned in a part of the plunger 18 that always (in use) makes contact with the bore 12B so as to seal the zone 19 from the transmission case environment.

A second O-ring 27 is also preferably provided to seal the junction between the body 12 and base 20. The zone 19 is thus preferably enclosed and sealed against both road grime and water from the outside of the transmission housing and against transmission fluid and any contaminants thereof from the inside of the transmission housing.

FIGS. 2 and 3 also depict, in part, the transmission which is generally designated 60 and includes a housing 62 through which a female threaded opening 64 is formed to receive the self-locking threaded portion 14 of the switch unit 10.

Within the transmission housing, as is conventional, is provided, adjacent to the switch unit receiving tapped opening 64, a cam 54 having a cam surface 56 which includes a low portion 58 and a high portion 59. When the transmission 60 is in "park", or (if so designed) in "neutral", the cam is positioned as shown in FIG. 2 with the surface 59 opposite the opening 64. When the shift lever is moved to place the transmission 60 in "reverse" the low surface 58 is moved (as shown in FIG. 2) to be opposite the opening 64. Intermediate surface depths are provided for the forward "drive" gears. It is generally considered much easier to manufacture the cam surface 56 within closer tolerances than it is to maintain close tolerances between the outer surface of the housing 62 which forms the seating for the switch unit 10. It is even harder to maintain close tolerances between the cam surface and the switch contacts within the unit 10.

In accordance with the present invention the transmission switch unit 10 is provided with means, generally designated 40, for automatically adjusting and fixing the position of the plunger 18 for the making and breaking of the electrical contacts in response to the initial arrangement of the switch unit 10 into its seating in the housing 62 and of the activating member, cam 54, into its predetermined "high" or "park" position. This automatic self-adjusting and fixing of the plunger allows for greater range of tolerance build-up between the cam surface 56 and the electrical contacts made and broken by the ring 30. In the illustrated construction, these means 40 preferably include an axial cylindrical bore 42 in the spool 26, an axial cylinder extension 18A of the plunger 18 for entering into the bore 42, and locking means 44 in the form of a slit sleeve lock washer, as may be better seen in FIG. 4. The means 40 provide for telescopic movement of the plunger 18 into the spool 26 in response to a relative large force, i.e. a force large enough to overcome the lock washer 44.

Referring to FIG. 4 it can be seen that the lock washer 44 has an outstanding rim portion 44R at one end which forms a shoulder surface 44S for bearing against the front face 26F of the spool 26 (FIGS. 2 and 3). A hollow cylindrical sleeve portion 44C extends from the rim 44R for seating in the enlarged bore 42 and which, in use, extends coaxially with the bore 42 and the plunger stem segment 18A from the front surface of the spool 26 to a position deep within the spool 26. Although the fit between the washer 44 and the bore 42 need not be tight as the spring 36 will at all times urge the spool 26 against the lock washer's rim 44R, for ease in assembly of the switch unit 10, a pair of outstanding side flanges 44F may be provided. The rim 44R and sleeve 44C are longitudinally split at 44SP.

The unstressed diameter of the opening in the rim is somewhat smaller than that of the stem portion 18A so as to resiliently spread to aid in captivating that portion 18A as it is inserted through the lock washer 44.

The sleeve of the lock washer 44 has a plurality of longitudinal slits 44L formed therein which slits 44L divide the sleeve into sections 44P. The end tips 44E of these sections 44P are preferably bent or curved inward. When the stem 18A of the plunger 18 is inserted into the lock washer 44 it not only spreads the washer 44 but also causes the rearward ends 44E of the sleeve sections 44P to be resiliently spread apart to bear tightly against the outer surface of the stem 18A.

The operation of the present invention is best shown in FIGS. 5 through 8 which illustrate the various stages of the assembly of the switch unit 10 into a transmission housing 60.

Figure 5:
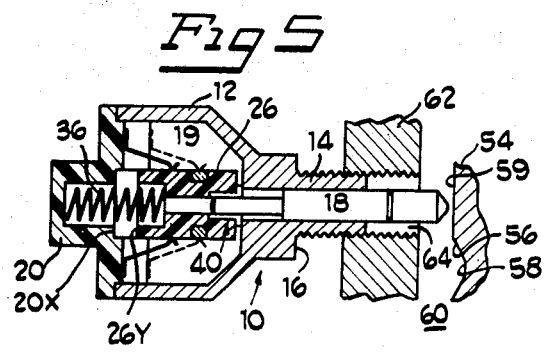
FIGS. 5-8 are simplified longitudinal sectional views similar to that of FIG. 2 of the switch unit of FIGS. 1-3, showing progressive stages of mounting the switch unit in a transmission, and useful therefore in illustrating the relationships between the internal switch unit's parts at various stages of installation.

As shown in FIG. 5, before mounting of the switch unit 10, the stem 18 extends forward a great deal further than the position it adopts in use. As shown, a marking groove 18G is formed therein to indicate this extended or outwardly telescoped position.

The first step in assembly is to place the transmission in "park" so that cam 54 is in a predetermined position with the highest or most protruding surface 59 opposite the opening 64. (Of course, if "neutral" is designed to allow starting, it presents the same cam height and could then also be employed in aligning the switch unit 10.)

Figure 6:
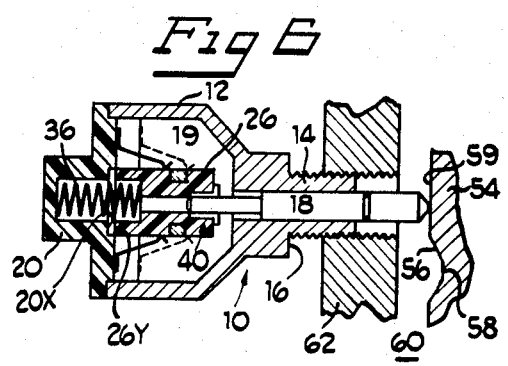
Figure 7:
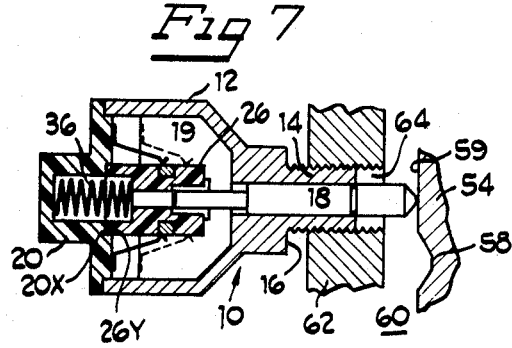

With this orientation the unit 10 is threadably advanced into the opening, as shown in FIG. 5. As the unit 10 continues to be threadably advanced, the forward tip of the plunger 18 makes contact with the surface 59 and is moved, relative to the body 12, backwards. The spool 26 is moved thereby backwards as shown in FIG. 6. The spool 26 is moved further backwards (relative to the body 12) as the unit 10 is threadably advanced until its surface 26Y makes contact with the surface 20X as shown in FIG. 7.

Figure 8:
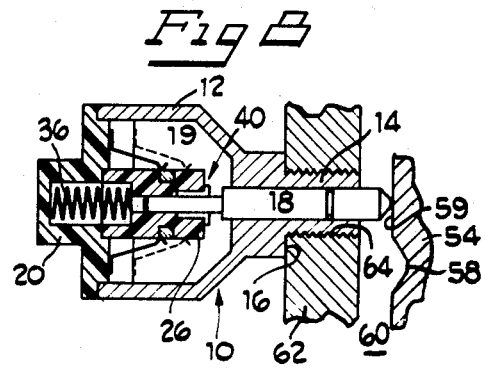

As the unit 10 is further threadably advanced the plunger 18 moves further into the spool 26, through the locking washing 44. This continues until the shoulder 16 meets the housing outer surface 62, as shown in FIG. 8. The switch unit 10 is now secured in place and properly aligned.

As should now be apparent a new and improved self-adjusting start-inhibitor switch unit for motor vehicles having automatic transmissions has been described in which the self-adjusting is achieved once-and-for-all upon assembly and further or continuing adjustments need not be made despite the extremes of tolerance build-up in an individual case. The switch unit described has the advantages of providing only a single moving unit, made up of the plunger 18, the spool 26 and the lock washer 44 for closing and opening contacts and also for those contacts to be easily sealed from the environment of the plunger acting cam.

The invention provides a switch unit that is both economical to manufacture, easy to mount and provides consistent behavior tolerance build-ups between different environments of mounting.

Although of primary utility when used in conjunction with vehicles equipped with automatic transmissions, the switch may also find use in vehicles equipped with manual transmissions for the control, for example, of only the back-up lamps.

It should also be noted that, if desired, the relationship between the actuating member predetermined or "high" position and the switch contacts may be other than that depicted in the specific embodiment without departing from the principles of the present invention. For example, the actuating cam may be made with the "reverse" or a "drive" position being the "highest" surface and the switch contacts axially make and break positions reordered to accommodate.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

What is claimed is:

1. In a transmission electrical switch unit adapted to be activated in response to transmission control members, said switch unit being of the type having a plunger that is axially displaced from and returned to a position in response to movement of an activating member to and from a predetermined position to thereby break and make an electrical contact, and which unit is adapted to be affixed in a seating adjacent to said activating member, the improvement of having provision within the switch unit for adjusting and fixing the axial spacial relationship of the plunger with respect to the contact, in response to the initial arrangement of the switch unit in said seating and of said activating member in the predetermined position, into one axial spacial relation so that the contact and plunger are thereafter maintained during normal use rigidly coupled together.

2. The improvement, as defined in claim 1, in a transmission electrical switch unit of the type there set out, wherein:
said adjusting means includes an internally located shaft (18A) and sleeve (26) arranged for inverse telescopic movement therewith during the affixing of said unit into its seating.

3. The improvement, as defined in claim 2, in a transmission electrical switch unit of the type there set out, wherein:
said adjusting means includes locking means (44) for locking to one of said shaft and said sleeve whereby determining that relative position during normal operation of the switch unit, but allows inverse telescopic motion therebetween for forces exceeding those encountered during normal operation.

4. The improvement, as defined in claim 3, in a transmission electrical switch unit of the type there set out, wherein:
said locking means is a locking washer.

5. A start inhibitor switch unit for use in motor vehicles equipped with transmissions comprising:
a housing having a threaded portion for mounting the unit to the vehicle;
a plunger (18) carried in said housing so as to be movable in response to an activating device of said vehicle;
means, mounted on said housing, including at least one electrical terminal, for defining a breakable electric current path, said means further including a movable circuit breaking and making member (26); and self-adjusting means (40) coupling together said circuit breaking and making member and said plunger for adjustably locking said circuit breaking and making member and said plunger together, said locking means being made so as to, in response to the initial mounting of the unit into the vehicle, allow for the spacing between said member and said plunger to be adjusted so that said member is at a predetermined operating position in relation to the actuating means.

6. A transmission electrical switch unit adapted to be fixed to a seating adjacent an activating member and to be activated in response to transmission control members, said switch unit comprising a plunger which is axially displaced from and returned to a position in response to movement of an activating member to and from a predetermined position to break and make an electrical contact, and means within the switch unit for adjusting the axial spacial relationship of the plunger with respect to the contact in response to the initial arrangement of the switch unit in said seating and of said activating member in the predetermined position, and for fixing said plunger and contact in that axial spacial relationship so that they remain in that relationship during normal use thereafter.

7. A switch unit according to claim 6, wherein adjusting means includes an internally located shaft and a sleeve arranged for telescopic movement therewith during the fixing of said unit into its seating.

8. A switch unit according to claim 6, wherein said adjusting means includes locking means for locking to said shaft and/or said sleeve, whereby determining their relative position during normal operation of the switch unit, but allows telescopic motion therebetween for forces exceeding those encountered during normal operation.

9. A switch unit according to claim 8, wherein said locking means is a locking washer.

10. A switch unit according to claim 5, wherein the locking means comprises an axially split spring sleeve surrounding said plunger and engaging in a bore in said breaking and making member, said sleeve normally locking into said plunger but being slidable thereon when extra force is applied to said plunger during mounting of the unit on a vehicle.

11. A switch unit according to claim 10, wherein the breaking and making member comprises a spool of insulating material having a circumferential conducting ring selectively engageable with a resilient contact connected to the or each terminal.

* * * * *